July 9, 1929.  A. J. LEWIS ET AL  1,719,894
METHOD AND APPARATUS FOR WIRING COIL SPRINGS
Filed Dec. 31, 1923  10 Sheets-Sheet 10

Patented July 9, 1929.

1,719,894

UNITED STATES PATENT OFFICE.

ARTHUR J. LEWIS AND WARREN S. REYNOLDS, OF STRATFORD, CONNECTICUT, ASSIGNORS TO JOHN CHATILLON & SONS, OF NEW YORK, N. Y., A CORPORATION OF NEW YORK.

METHOD AND APPARATUS FOR WIRING COIL SPRINGS.

Application filed December 31, 1923. Serial No. 683,584.

This invention relates to a method and apparatus for wiring coil springs before tempering. Coil springs are used in large quantities for tire pressure gauges, scales, etc., and it is necessary that such springs be of uniform strength and resiliency. The object of this invention is to provide a method and apparatus for automatically wiring such springs rapidly and uniformly, and more specifically with a single wire and in such manner as to keep the binding wires on opposite sides of the coil in their proper relation.

According to this invention, the springs are passed to a work support, where a wire is automatically bound around the ends of the spring in such manner that accidental removal of the binding wire is prevented and so that each spring is uniformly bound. After the wire has been applied, the work support is moved out of the way when the wired spring falls into a bin beneath.

Referring to the drawings.

Figure 1:
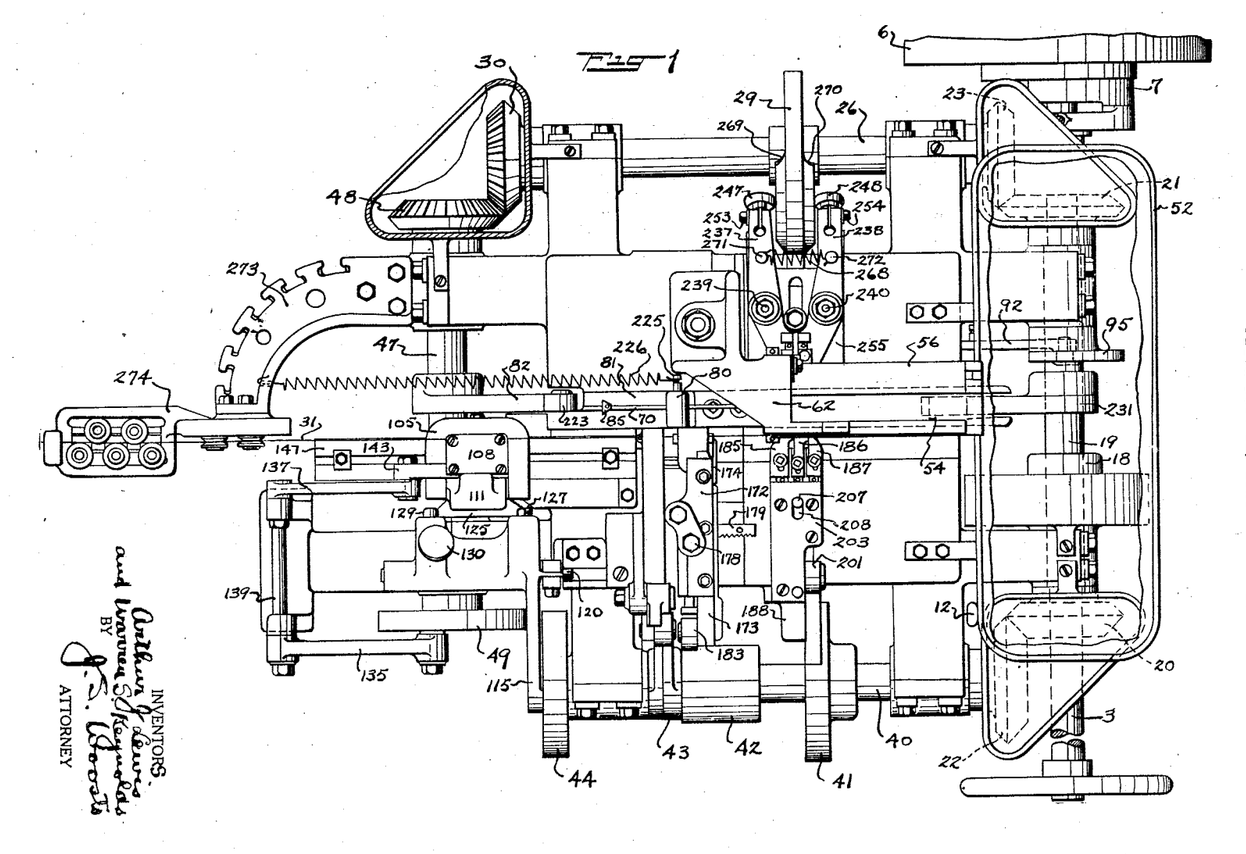
Figure 1 is a plan view of the machine.
Figures 2, 3:
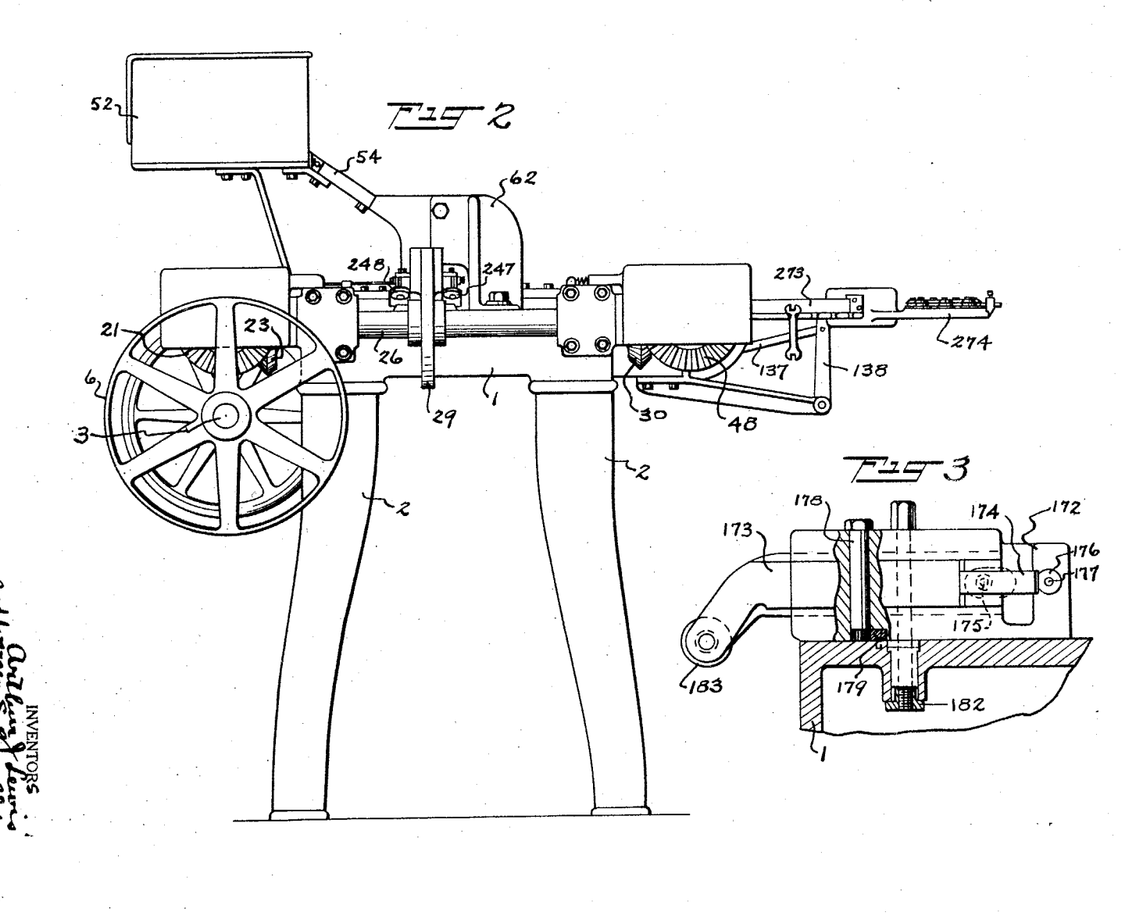
Fig. 2 an elevation of the machine.
Fig. 3 is a fragmentary view of the cutting-off tool and its supporting slide.
Figures 4, 5:
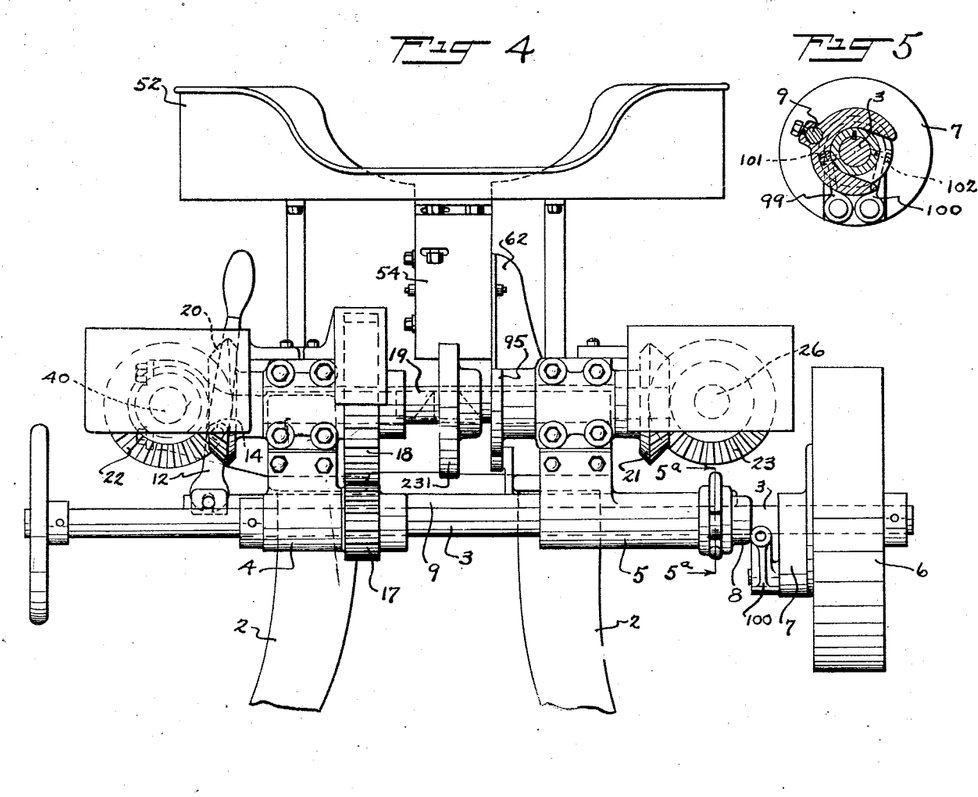
Fig. 4 is a partial elevation of the operating side of the machine.
Fig. 5 a section on the line 5ª—5ª of Fig. 4.

From Figs. 1 and 2 it will be seen that the machine comprises a table 1 mounted on legs 2 and having attached the shaft 3 mounted in bearings 4 and 5, driven by the pulley 6. In Fig. 4 is shown the clutch 7 of any commercial type controlled by the lever 12 pivoted at 14 and connected to the shaft 9 for moving the collar 8 and actuating the clutch. While the clutch may be of any well-known type, for purposes of illustration is shown in Fig. 5 a clutch of the type wherein movement of the collar 8 between the pins 101 and 102 spreads these pins turning the levers 99 and 100 and expanding the clutch into its driving position. The shaft 19 is driven from the shaft 3 through the gears 17 and 18. The shaft 19 is provided with some of the cams for actuating the automatic tools and drives shafts 26, 40 and 47 through the bevel gears 20, 21, 22, 23, 30 and 48. Mounted on these shafts are the cams 29, 95, 231 (Figs. 6 and 7), 41, 42, 43, 44, and 82.

Figures 8, 9, 10, 11:
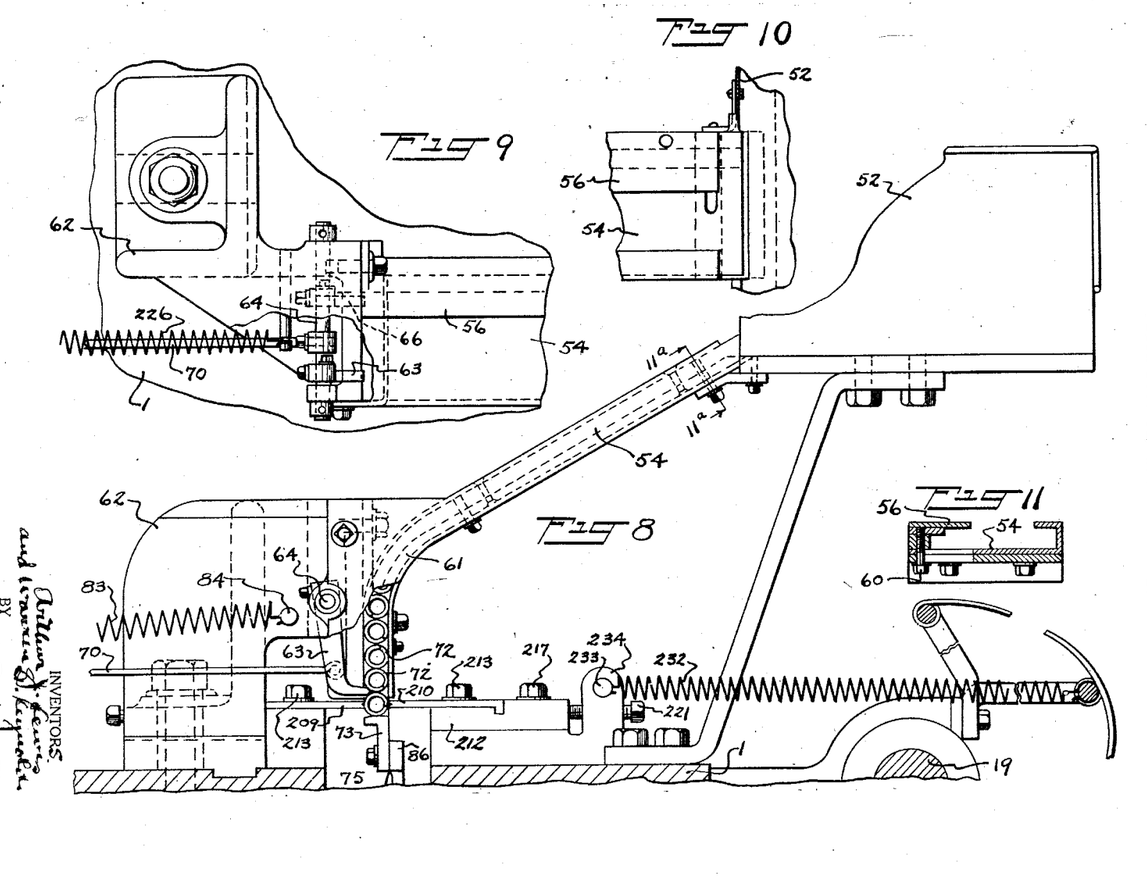
Fig. 8 shows the spring hopper positioned above the machine.
Fig. 9 is a plan view of part of the spring feeding mechanism with parts broken away.
Fig. 10 is a plan view of the upper end of the coil spring chute.
Fig. 11 is a section of the coil spring chute on the line 11ª—11ª of Fig. 8.

Over the table is mounted the hopper 52 from which the springs to be wired pass down the chute 54. The chute is partially closed at 56 as shown in Fig. 11 to prevent the springs from coming out, and the width of the chute is laterally adjustable by the screws 60 to fit springs of different size. The lower end of the chute 54 is curved at 61 and fastened to the bearing block 62. Upon the bearing block are mounted the levers 63 and 66 (see Figs. 8 and 9) pivoted at 64 and actuated by the rod 70, slidably mounted in the lug 80 and held against the coil 72 just above the one being wound by the spring 83, fastened to a pin 84 in the bearing block 62 at one end and to the rod 70 by the nuts 74 at its other end. While the automatic pulleys operate upon the lowermost coil spring 72 to wire it, the work support 73, mounted on lever 86 retains the spring in position and prevents its falling. The lever 86 is pivoted at 88 to the bracket 90 attached to the table 1 and is actuated by the lever 92, provided at one end with a cam follower 94 for cooperation with the cam 95. A rod 98 supports one end of the spring 96 which is attached to the lever 92 and retains the cam follower 94 on the cam 95.

Figure 15:
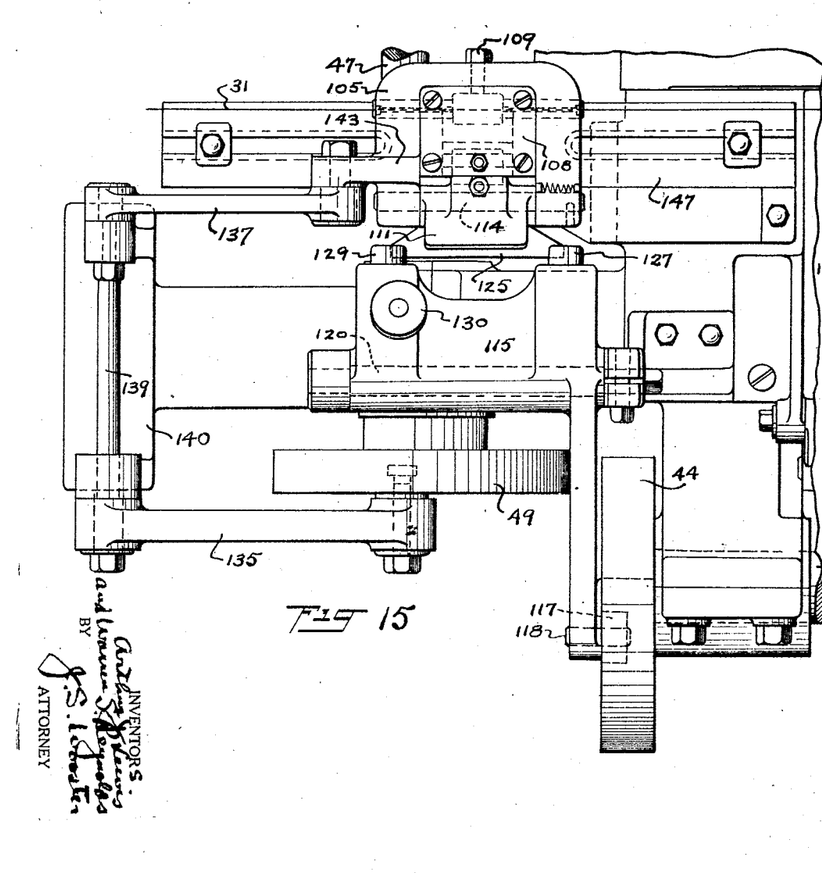
Fig. 15 is a plan view of the wire feeding mechanism, Fig. 16 an elevation partly in section of the mechanism shown in Fig. 15.
Figure 16:
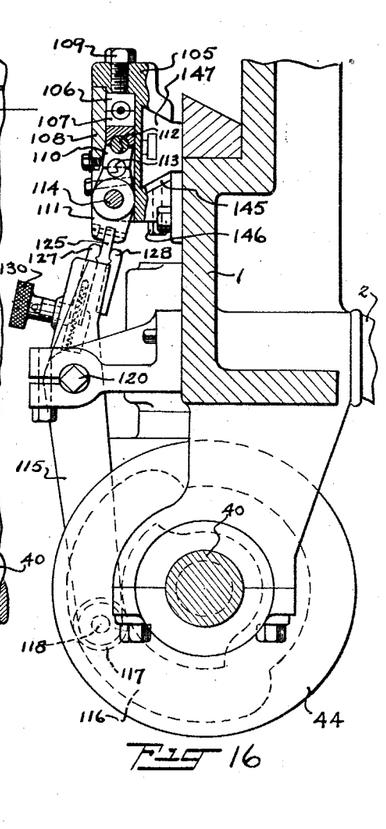
Figures 19, 20, 21:
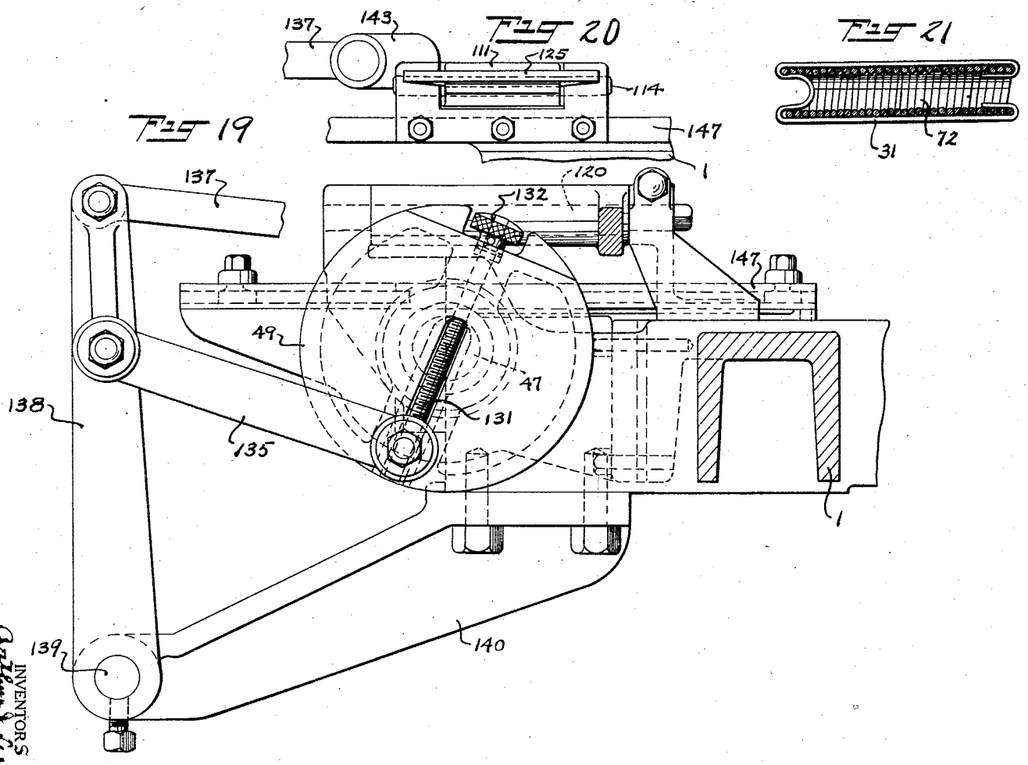
Fig. 19 is a view of part of the wire feeding mechanism.
Fig. 20 is a fragmentary view of a part of this wire feeding mechanism.
Fig. 21 is a section of a coil spring after being wound.

The wire feeding mechanism is substantially similar to that described in the Lewis Patent #1,097,652, dated May 26, 1914, and comprises, as shown in Figs. 15 and 16, the feed slide 105 provided with a lug 143 attached to the link 137 actuated by the lever 138 which is pivoted at 139 to the support 140 and receives its motion from the link 135 cooperating with the disk 49. The reciprocating slide 105 carries a fixed jaw 106 opposite a movable jaw 107 between which the wire 31 extends. The fixed jaw 106 is held in position by the retaining plate 108 and is adjustable by means of the screw 109. The movable jaw 107 is reciprocated through the link 110, lever 111, and pintles 112 and 113, all of which are actuated by the lever 115 from the cam 44 after the manner described in the aforementioned patent. The lever 115 is provided at its outer end with a roller 117 on pin 118 which moves in the cam slot 116. A connecting plate 125 fastened to the lever 111 is adapted to slide between the upper jaw 127 and the lower jaw 128. One of the upper jaws 129 may be removable by means of the thumb nut 130. The amount of motion imparted to the feed slide is adjustable by controlling the attachment of the link 135 to the disk 49 by means of the screw 131 and its thumb nut 132. In Figure 19 the shaft 120 is eccentrically and adjustably mounted to control the movable jaw 107. In Fig. 16, it will be seen that the slide 105 is provided with an adjusting strip 145 to take up wear, and is held in position on its guideway 147 by adjusting screws 146.

Figures 22, 23:
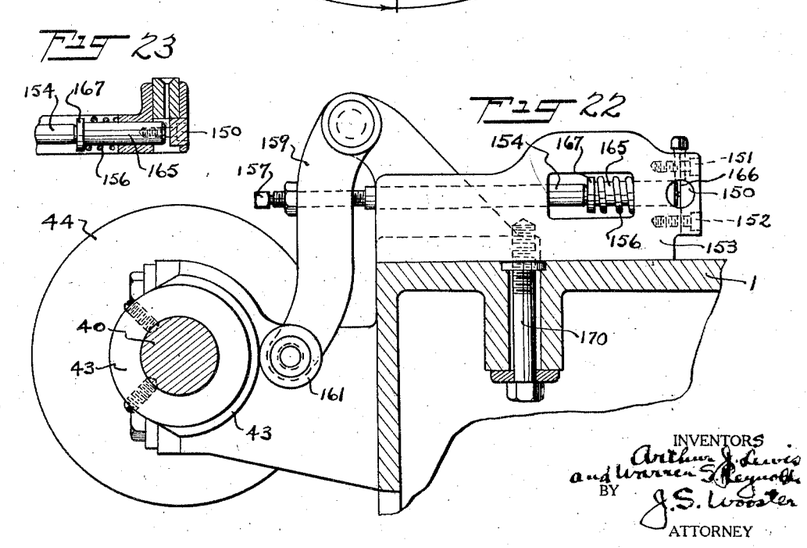
Fig. 22 shows the wire holding mechanism to prevent overfeeding.
Fig. 23 is a plan detail in section of the wire holding mechanism of Fig. 22.

The clamping mechanism shown in Figs. 1, 22 and 23 retains the wire in position after its release by the feeding mechanism so that the wire is not overfed nor withdrawn. This mechanism comprises a bearing block 153 to which is secured the clamp plate 150 by screws 151 and 152. Slidably mounted in the bearing block is the plunger 165 having the spring 156 cooperating with the shoulder 167 thereon and tending to move the plunger to the left. The spring forces the rod 154, which is slidably mounted in the bearing block 153, against the adjustable set screw 157 attached to the lever 159 provided at one end with a cam roller 161. In this manner the roller is kept in contact with the cam 43 and this cam functions to move the plunger 165 to clamp the wire against the plate 150 at the proper time. Through a slot in the table 1 is secured the clamping means 170 for retaining the bearing block in its adjusted position.

Means for cutting off the wire in the lengths desired comprise the tool shown in Fig. 3, having a supporting block 172 provided with a slide 173 adapted to reciprocate therein and impart motion to the cutoff tool 174 which is clamped to the slide 173 by the screw 175. A hardened bearing 176, provided with an aperture 177 of the desired size to enable the wire to freely pass therethrough is secured in the bearing block 172. Motion is imparted to the slide 173 from the cam roller 183 cooperating with the cam 42. To change the position of the cutoff tool and vary the length of wire cut, a pinion secured on a stud 178 engages a stationary rack 179. After being moved the clamping means 182 retains the bearing block 172 in its adjusted position.

Figures 17, 18:
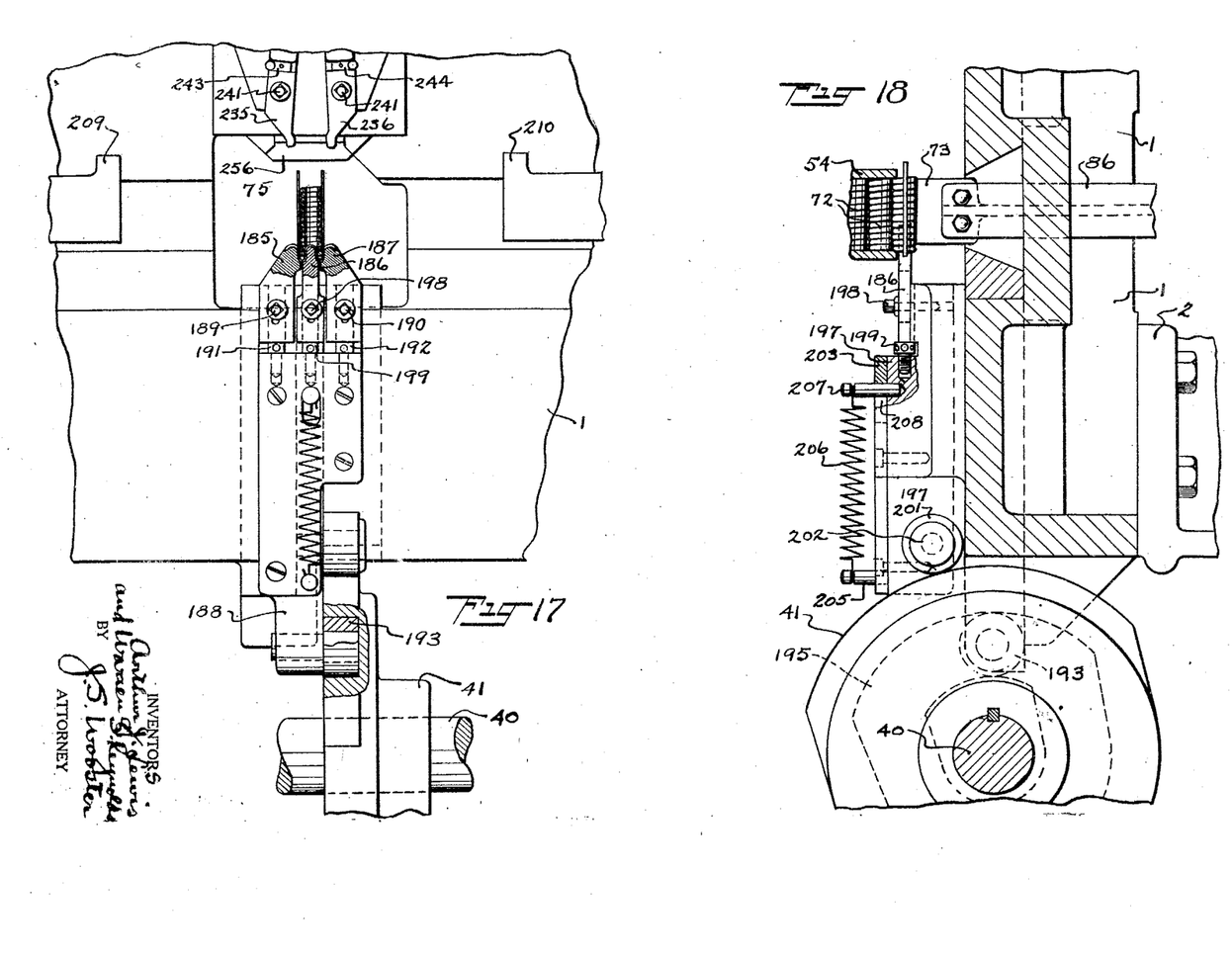
Fig. 17 is a plan view of the forming tools and their guiding mechanism.
Fig. 18 is a view of the device shown in Fig. 17 partly in section.

The forming tools 185, 186 and 187 for bending the wire around and into one end of the spring are each adjustable by means of the screws 191, 199 and 192 clamped in adjusted position by means of the bolts 189, 198 and 190. The slide 188 on which these forming tools are mounted is actuated by a roller 193 turning within the cam groove 195. The slide 188 has mounted thereon a second slide 197 carrying the tool 186 and this second slide is actuated by means of the roller 201 engaging the cam 41. A pin 205 is provided on the slide 188 and a similar pin 207 which slides in the opening 208 of retaining plate 203, is secured to a slide 197 while a tension spring 206 engages these two pins and keeps the roller 201 in contact with its cam.

Figures 6, 7:
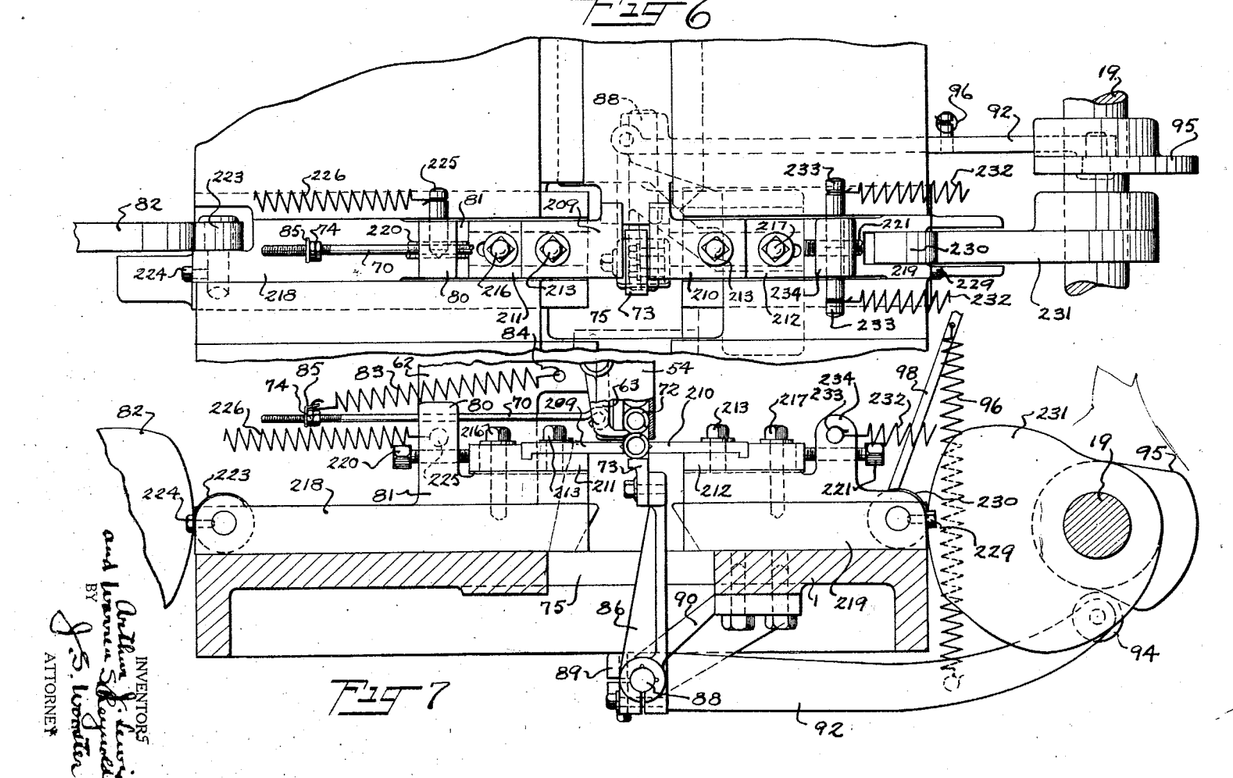
Fig. 6 is a plan view of the work holding slides.
Fig. 7 is an elevation of the device shown by Fig. 6.

For cooperation with the sides of the binding wire along the sides of the spring the holding tools 209 and 210 are provided and movable through a sufficient distance to give the wire its necessary clearance in moving through the arc caused by the forming tools bending this wire along the sides of the spring. Figs. 6 and 7 show how these tools are secured to their blocks 211 and 212 by the clamping bolts 213. The blocks 211 and 212 are in turn clamped to their slides by means of the bolts 216, 217, the adjusting screws 220 and 221 being used for accurately positioning the blocks before tightening the screws 216 and 217. The slide 218 is actuated by the roller 223 held in place by the screw 224 and engaging the cam 82. The lug 80 on the slide is provided with a pin 225 upon which is fastened a spring 226 for retaining the roller in contact with its cam 82 and said spring is attached at its other end to the frame of the machine as shown in Fig. 1. The opposite slide 219 is provided with a similar roller 230 and retaining screw 229. The roller 230 is engaged by the cam 231 and held in contact therewith by the springs 232 engaging pins 233 in the lug 234.

Figure 12:
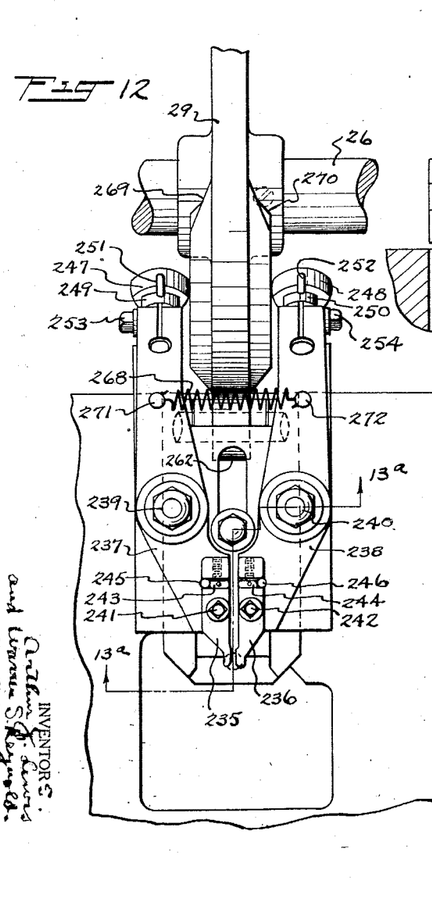
Fig. 12 is a plan view of the tucking tools and their operating mechanism, Fig. 13 a section on the line 13ª—13ª of Fig. 12, Fig. 14 an elevation of the tucking tools and their slide.
Figures 13, 14:
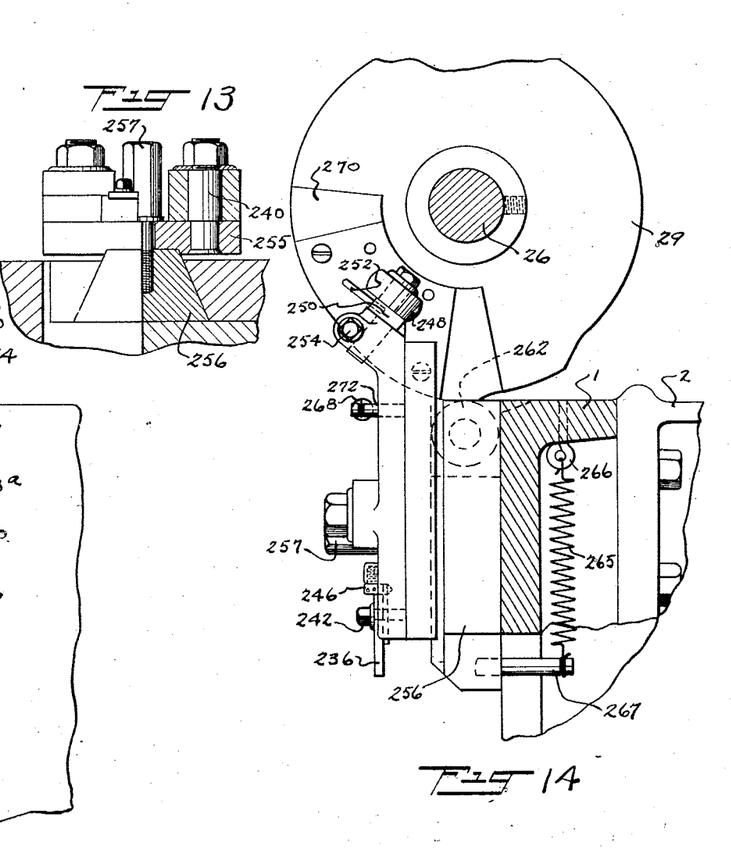

The tucking tools 235 and 236 are shown in Figs. 12 to 14 as being clamped upon the levers 237 and 238 by the screws 241 and 242 and provided with adjusting screws 243 and 244 which have locking pins 245 and 246 to retain them in adjusted position and prevent accidental rotation through vibration or jar. The levers 237 and 238 are pivoted at 239 and 240 and provided at their other ends with rollers 247 and 248 mounted upon eccentric pins 249 and 250 to provide a horizontal adjustment of these rollers. Handles 251 and 252 in the pins 249 and 250 provide adjustment of the tools. Clamp screws 253 and 254 retain the rollers in adjusted position. The levers 237 and 238 are pivoted to the plate 255 which in turn is adjustably secured to the slide 256 by the screw 257. The roller 262 attached to the slide 256 is held in contact with the cam 29 by the spring 265 connected at 266 to the table 1 and at 267 to a pin secured to the slide 256. A spring 268 extending between the pins 271 and 272 keeps the rollers 247 and 248 in contact with their cam surfaces 269 and 270.

Figure 24:
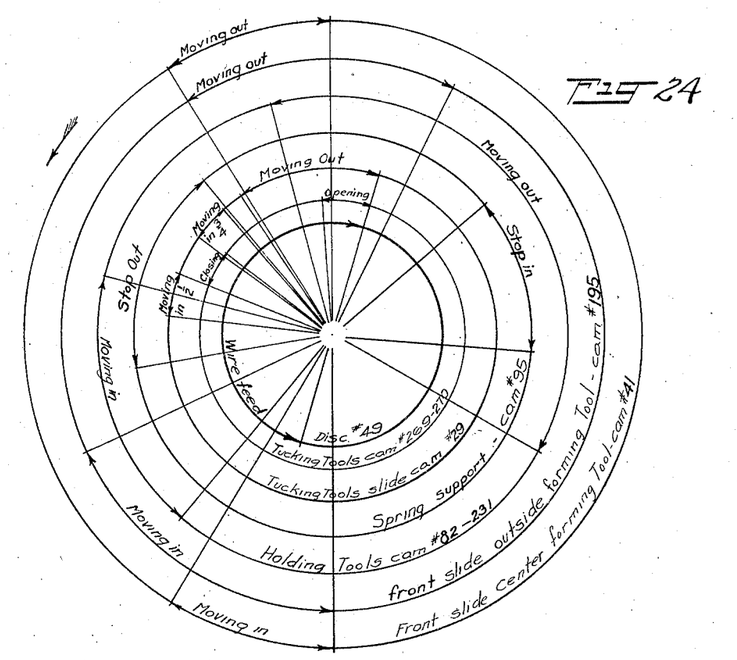
Fig. 24 is a time chart for the machine.

Upon an extension of one of the bearings for shaft 47 is a grooved member 273 provided therein with holes of different diameters for supporting tools and wrenches and also for carrying a familiar type of wire straightening device 274. The timing chart illustrated in Fig. 24 indicates the time of actuation of the various tools with respect to other tools.

In operation the wire passing through the straightening device 274 is gripped by the jaws 106 and 107 contained in the feed slide 105 and fed inwardly until the jaws are released. The clamping device shown in Fig. 22 then retains the wire in position while being sheared by the cutting tool of Fig. 3 and while the feed slide 105 is being moved outwardly. The forming tools 185 and 187 press the wire against the lowermost spring 72 and bend the wire along opposite sides of the spring when or after the forming tool 186 moves inwardly to bend a portion of the wire inside the coil as shown in Fig. 17. The holding tools 209 and 210 retain the wire against the spring before the tucking tools 235 and 236 engage the wire. The tucking tools then move toward each other to bend the ends of the wire over the ends of the coil and subsequently these tucking jaws move inwardly to bend the ends of the wire into and against the inside of the coil. When the binding operation has thus been completed the tucking, holding and forming tools are moved away from the spring and the work support 73 is moved to one side by the lever 86, allowing the bound spring to fall through the opening 75 in the table into a bin below. The work support 73 is then returned to its position indicated in Fig. 7 when the rod 70 is moved to release the spring held by the levers 63 and 66 and allow this spring to fall upon the work support 73. This spring is then wired after the manner just described and the levers 63 and 66 returned to hold the spring 72 just above the one being wired. From the various adjustments described for each of the tools and for the adjustment possible with the chute 54 it will be seen that this machine is adapted for wiring springs of different size.

Among the advantages of this machine may be mentioned its automatic operation whereby as many as 10,000 springs may be wired in a day. Another advantage is the uniformity in wiring the springs whereby all springs are bound under substantially the same tension and with the result that after heat treatment the springs are of uniform strength and resiliency. Another advantage of this invention resides in the arrangement of the actuating cams upon the outside of the table whereby adjustments of the several tools is more easily made.

We claim:

1. The method of wiring a coil spring comprising wrapping a wire longitudinally around opposite sides thereof, and bending the wire around the ends of the spring at each end thereof to bind it.

2. The method of wiring a coil spring comprising wrapping a wire longitudinally around opposite sides thereof, bending the ends of the wire around to engage the inner surface of the spring at one end thereof, and bending an intermediate portion of the wire to engage the inner surface of the spring at the other end thereof to form a connecting link.

3. The method of wiring a coil spring comprising wrapping a wire longitudinally around opposite sides thereof and then bending spaced portions of said wire to engage the inner surface of said spring to bind it.

4. The method of wiring a coil spring which comprises bending a wire over the sides and into an end of said spring, holding the wire against the sides of the spring, and then bending the rest of the wire over the opposite end of and into said spring.

5. A machine for wiring a coil spring comprising a support for the spring, means for longitudinally wrapping a binding wire around the spring, and means for bending an intermediate portion of said wire around one end of said spring to bind it and act as a link connecting the portions of the wire lying along opposite sides of the spring.

6. A machine for binding coil springs comprising means for automatically feeding a wire coil, and means for applying and setting binding wire longitudinally of the coil.

7. A machine for wiring a coil spring comprising means for wrapping a wire longitudinally around the spring, means for bending spaced portions of the wire around the ends of the spring to bind it, and means for bending an intermediate portion of the wire to form a spacing link between the binding portions of the wire.

8. In a machine for wiring a coil spring, the combination with a support for said spring, of means for placing springs successively on said support, means for successively wrapping a binding wire around each spring while on the support, and means for successively removing the springs from said support.

9. A machine for wiring coil springs comprising means for automatically feeding said springs and means for simultaneously applying and setting binding wire longitudinally and on substatially opposite sides of the coil.

10. In a machine for wiring coil springs the combination with a passageway, of means for intermittently moving a plurality of coils therethrough, and means adjacent the mouth of said passageway for binding a wire around each spring successively.

11. In a machine for wiring coil springs, the combination with a passageway of means for intermittently moving a plurality of coils therethrough, and means adjacent the mouth of said passageway for binding a wire around each spring successively, said first mentioned means including a support for the coil while being bound with said wire, and also including means for withdrawing the bound coil after removal of said second mentioned means.

12. In an apparatus for wiring springs, the combination with a chute down which the springs are moved, of a support for said springs below said chute, means for applying binding wire to the lowermost spring in the chute, means for removing said support after application of the binding wire, and means for retaining the other springs in said chute until return of said support to its first mentioned position.

13. In an apparatus for wiring springs, the combination with a chute down which the springs are moved, of a support for said springs below said chute, means for applying binding wire to the lowermost spring in the chute, means for removing said support after application of the binding wire, and means for retaining the other springs in said chute until return of said support to its first mentioned position, said chute being expansible to receive springs of different length.

14. A machine for wiring coil springs comprising means for successively cutting off predetermined lengths of a wire, a support for coil springs, means for successively placing the coil springs on said support, means for wrapping the wire around each spring while on the support, and means for successively removing the wrapped springs from the support.

15. In an apparatus for wiring coil springs, the combination with a pair of forming tools for bending the wire over an end of the coil, of a bending tool movable relatively to the forming tools and adapted to bend the wire into said coil, holding tools for retaining the wire along opposite sides of the coil, and a pair of tucking jaws for bending the ends of said wire over and into the opposite end of said coil, each of said tools being adjustable to wire springs of different size.

16. In an apparatus for wiring coil springs, the combination with a pair of forming tools for bending the wire over an end of the coil, of a bending tool movable relatively to the forming tools and adapted to bend the wire into said coil, holding tools for retaining the wire along opposite sides of the coil and a pair of tucking jaws for bending the ends of said wire over and into the opposite end of said coil.

17. A machine for wiring coil springs comprising means for shaping the wire over an end of the coil, means for pushing the wire into that end of the coil, means for holding the wire along opposite sides of the coil and means for shaping the wire over and pushing it into the opposite end of the coil.

18. In a machine for wiring coil springs the combination with means for supporting a coil spring, of means for wrapping a length of wire longitudinally around said spring, means for holding said wire against opposite sides of said spring, wire bending jaws, means for moving said jaws into engagement with the ends of said wire, and means for further moving said jaws to bend the wire over the ends of the spring to bind it.

19. A machine for wiring a coil spring comprising wire feeding means, spring feeding and holding means, and means for longitudinally applying binding wire in spaced relation on a spring, including means movable in and out of the coil in timed relation to said spring feeding and holding means for bending portions of said wire over an end and into said coil.

20. A machine for wiring a coil spring comprising wire feeding means, spring feeding and holding means, and means for longitudinally applying binding wire in spaced relation on a spring, and including a tool movable in and out of the coil in timed relation to said spring feeding and holding means for cooperation with said wire on the inner sides of the coil.

21. A machine for wiring a coil spring comprising wire feeding means, spring feeding and holding means, and means for longitudinally applying binding wire in spaced relation on a spring and including a pair of tools movable laterally and longitudinally in timed relation to said spring feeding and holding means for bending portions of said wire over an end and into said coil.

Signed at Bridgeport, in the county of Fairfield and State of Connecticut, this 22nd day of December A. D. 1923.

ARTHUR J. LEWIS.
WARREN S. REYNOLDS.